United States Patent
Lappos et al.

(10) Patent No.: US 10,831,193 B2
(45) Date of Patent: Nov. 10, 2020

(54) ENHANCED TAXI CONTROL FOR RIGID ROTORS

(71) Applicant: Sikorsky Aircraft Corporation, Stratford, CT (US)

(72) Inventors: Nicholas D. Lappos, Beryl, UT (US); Christopher A. Thornberg, Newtown, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 308 days.

(21) Appl. No.: 15/812,707

(22) Filed: Nov. 14, 2017

(65) Prior Publication Data

US 2019/0146490 A1 May 16, 2019

(51) Int. Cl.
| | |
|---|---|
| *G05D 1/00* | (2006.01) |
| *B64C 25/34* | (2006.01) |
| *B64C 27/10* | (2006.01) |
| *B64C 25/00* | (2006.01) |
| B64C 25/32 | (2006.01) |
| B64C 25/08 | (2006.01) |

(52) U.S. Cl.
CPC ........... *G05D 1/0083* (2013.01); *B64C 25/00* (2013.01); *B64C 25/001* (2013.01); *B64C 25/34* (2013.01); *B64C 27/10* (2013.01); *B64C 25/08* (2013.01); *B64C 2025/008* (2013.01); *B64C 2025/325* (2013.01)

(58) Field of Classification Search
CPC ........ G05D 1/0083; G05D 1/00; B64C 25/34; B64C 27/10; B64C 25/001; B64C 2025/008; B64C 2025/325; B64C 25/08; B64C 25/00

USPC ..... 701/3; 244/17.11, 17.13, 2, 60, 12.3, 54, 244/139, 141

See application file for complete search history.

(56) References Cited

U.S. PATENT DOCUMENTS

| | | | |
|---|---|---|---|
| 1,884,596 A | 10/1932 | De La Cierva | |
| 2,630,989 A | 3/1953 | Sikorsky | |
| 2,740,595 A * | 4/1956 | Bakewell | B64C 27/10 244/17.11 |
| 5,863,013 A | 1/1999 | Schmittle | |
| 2011/0031345 A1* | 2/2011 | Hickman | B64C 27/52 244/17.13 |
| 2012/0160954 A1* | 6/2012 | Thomassey | B64C 27/82 244/17.13 |

(Continued)

FOREIGN PATENT DOCUMENTS

| | | |
|---|---|---|
| EP | 2634088 A1 | 9/2013 |
| WO | 2014055269 A1 | 4/2014 |

OTHER PUBLICATIONS

European Office Action; International Application No. 18205640.8-1010; International Filing Date: Nov. 12, 2018; dated Feb. 10, 2020; 7 pages.

(Continued)

*Primary Examiner* — Shardul D Patel
(74) *Attorney, Agent, or Firm* — Michael Best & Friedrich LLP

(57) ABSTRACT

An aircraft includes an airframe having an aircraft longitudinal axis and a main rotor system supported by the airframe. The main rotor system is rotatable about an axis of rotation. The airframe is tiltable relative to a ground surface to form a non-zero tilt angle between the aircraft longitudinal axis and the ground surface.

18 Claims, 4 Drawing Sheets

(56) References Cited

U.S. PATENT DOCUMENTS

| | | | | |
|---|---|---|---|---|
| 2013/0221159 A1* | 8/2013 | Giannakopoulos | .... | B64D 17/36 244/139 |
| 2015/0060596 A1* | 3/2015 | Garcia | .................. | B64D 35/06 244/17.23 |
| 2016/0280366 A1* | 9/2016 | Massal | ...................... | F16F 9/56 |
| 2016/0306363 A1* | 10/2016 | Wang | ...................... | G01S 19/15 |
| 2018/0290736 A1* | 10/2018 | Mikic | ..................... | B64C 27/52 |
| 2018/0346102 A1* | 12/2018 | Dahl | ...................... | B64C 25/20 |

OTHER PUBLICATIONS

Extended European Search Report; International Application No. 18205640.8; Date Filed: Nov. 12, 2018; dated Jan. 21, 2019; 2 pages.

* cited by examiner

ENHANCED TAXI CONTROL FOR RIGID ROTORS

BACKGROUND

The subject matter disclosed herein generally relates to rotary wing aircraft, and in particular, to a system for use during a taxiing operation of a rotary wing aircraft.

Movement of an aircraft while the aircraft is located on the ground is commonly known as taxiing. After landing on a runway of an airport or other location, an aircraft must typically taxi from the runway to a desired station where the aircraft can be parked. Similarly, the aircraft may need to taxi away from a parked location for takeoff. Additionally, the aircraft may need to execute a landing to a runway with forward motion, known as a running landing. Conventionally, taxiing movement of a rotary wing aircraft typically occurs by flapping the rotating main rotor system to create a forward thrust. However, newer aircraft applications incorporating a coaxial rigid rotor system have a limited ability to tilt or flap the rotor. Further, the flap that is achievable generates a large and potentially damaging moment about the rotor hub due to the cyclic inputs. In addition, although an auxiliary propulsor or propeller may be used to generate forward thrust during taxi, use of such propeller operation has inherent risks associated with safety of nearby personnel and potential propulsor damage due to ingestion of debris on the taxi way.

BRIEF DESCRIPTION

According to one embodiment, an aircraft includes an airframe having an aircraft longitudinal axis and a main rotor system supported by the airframe. The main rotor system is rotatable about an axis of rotation. The airframe is tiltable relative to a ground surface to form a non-zero tilt angle between the aircraft longitudinal axis and the ground surface.

In addition to one or more of the features described above, or as an alternative, in further embodiments when the airframe has a non-zero tilt angle, operation of the main rotor system generates a forward thrust.

In addition to one or more of the features described above, or as an alternative, in further embodiments the main rotor system is a rigid rotor system.

In addition to one or more of the features described above, or as an alternative, in further embodiments the main rotor system further comprises an upper rotor system rotatable about the axis of rotation in a first direction and a lower rotor system rotatable about the axis of rotation in a second direction.

In addition to one or more of the features described above, or as an alternative, in further embodiments the aircraft further comprises at least one landing gear assembly coupled to the airframe wherein the airframe is tiltable relative to the ground surface in response to varying a configuration of the at least one landing gear assembly.

In addition to one or more of the features described above, or as an alternative, in further embodiments the at least one landing gear assembly includes a mechanism for transforming the at least one landing gear.

In addition to one or more of the features described above, or as an alternative, in further embodiments the at least one landing gear assembly further comprises: a nose landing gear assembly disposed near a first end of the airframe and at least one rear landing gear assembly disposed near a tail of the airframe.

In addition to one or more of the features described above, or as an alternative, in further embodiments the configuration of the nose landing gear assembly and the at least one rear landing gear assembly are varied independently.

In addition to one or more of the features described above, or as an alternative, in further embodiments the non-zero tilt angle is generated in response to varying the configuration of the nose landing gear assembly.

In addition to one or more of the features described above, or as an alternative, in further embodiments the non-zero tilt angle is generated in response to varying the configuration of the at least one rear landing gear assembly.

In addition to one or more of the features described above, or as an alternative, in further embodiments the non-zero tilt angle is generated in response to varying the configuration of both the nose landing gear assembly and the at least one rear landing gear assembly.

In addition to one or more of the features described above, or as an alternative, in further embodiments non-zero tilt angle is generated by reducing a vertical length of the nose landing gear assembly and by increasing a length of the at least one rear landing gear assembly.

According to another embodiment, a method of taxiing an aircraft includes determining a desired tilt angle of the aircraft, tilting an airframe of the aircraft to achieve the desired tilt angle, and operating a main rotor system of the aircraft while the airframe of the aircraft is at the desired tilt angle to generate a forward thrust.

In addition to one or more of the features described above, or as an alternative, in further embodiments the desired tilt angle is up to 45 degrees.

In addition to one or more of the features described above, or as an alternative, in further embodiments the desired tilt angle is between 4 degrees and 6 degrees.

In addition to one or more of the features described above, or as an alternative, in further embodiments tilting the airframe further comprises varying a configuration of at least one landing gear assembly of the aircraft.

In addition to one or more of the features described above, or as an alternative, in further embodiments varying a configuration of the at least one landing gear assembly includes increasing a vertical length of the landing gear assembly.

In addition to one or more of the features described above, or as an alternative, in further embodiments varying a configuration of the at least one landing gear assembly includes decreasing a vertical length of the landing gear assembly.

In addition to one or more of the features described above, or as an alternative, in further embodiments varying a configuration of the at least one landing gear assembly includes increasing a vertical length of a first landing gear assembly and decreasing a vertical length of a second landing gear assembly.

In addition to one or more of the features described above, or as an alternative, in further embodiments the at least one landing gear assembly further comprises a mechanism operable to vary the configuration of the at least one landing gear assembly in response to a signal.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Figure 1:
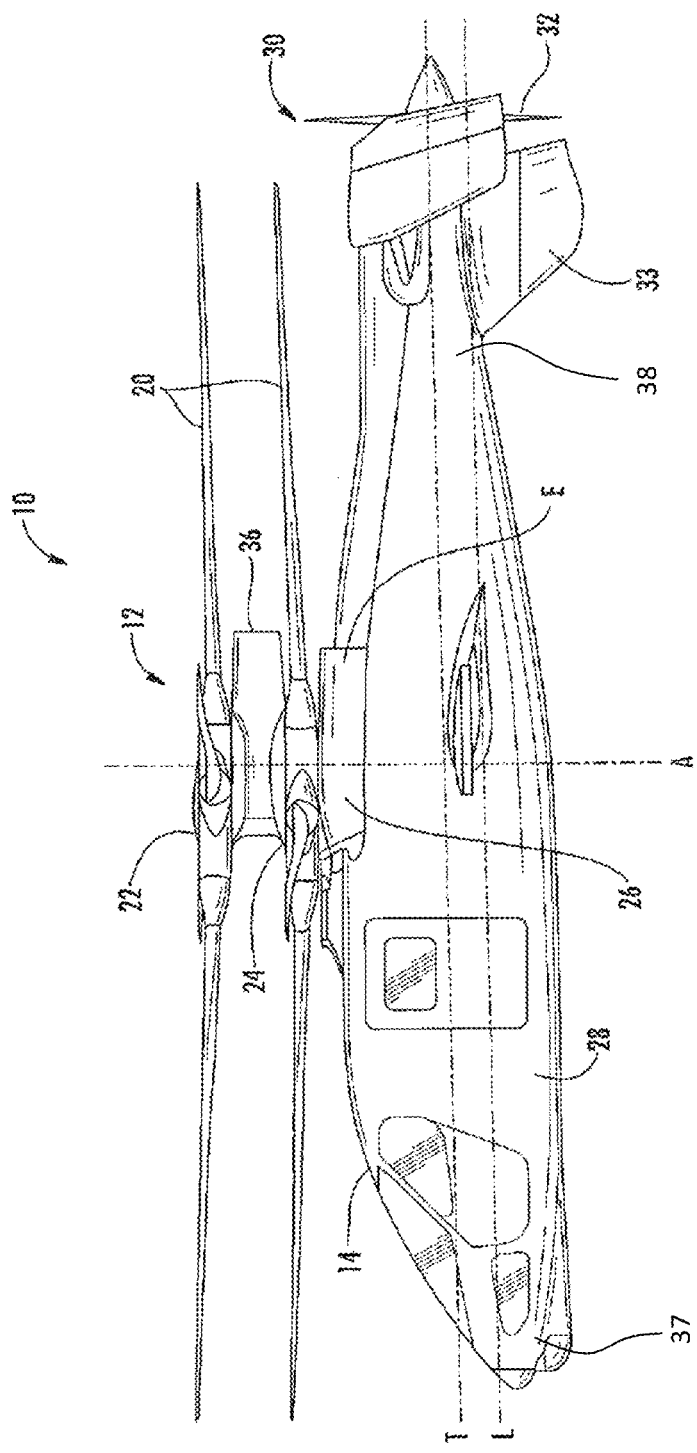
FIG. 1 is a perspective view of an example of a rotary wing aircraft with a counter rotating rigid rotor design and a propulsor.

FIG. 1 illustrates an exemplary vertical takeoff and landing (VTOL) rotary-wing aircraft 10 having a dual, counter-rotating, rigid coaxial rotor system 12 which rotates about an axis of rotation A. The aircraft 10 includes an airframe 14 which supports the dual, counter rotating, coaxial rotor system 12 as well as an optional translational thrust system 30 which provides translational thrust generally parallel to an aircraft longitudinal axis L. Although a particular aircraft configuration is illustrated in this non-limiting embodiment, other rotary-wing aircraft will also benefit from embodiments of the invention.

The dual, counter-rotating, coaxial rotor system 12 includes an upper rotor system and a lower rotor system. Rotor system 12 includes a plurality of rotor blades 20 mounted to a rotor hub 22, 24 for rotation about rotor axis of rotation A. A plurality of the main rotor blades 20 project substantially radially outward from the hubs 22, 24. Any number of blades 20 may be used with the rotor system 12. The rotor system 12 includes a rotor hub fairing 36 generally located between and around the upper and lower rotor systems such that the rotor hubs 22, 24 are at least partially contained therein. The rotor hub fairing 36 provides drag reduction.

A main gearbox 26 may be located above the aircraft cabin 28 and drives the rotor system 12. The translational thrust system 30 may be driven by the same main gearbox 26 which drives the rotor system 12. The main gearbox 26 is driven by one or more engines (illustrated schematically at E).

The translational thrust system 30 may be mounted to the rear of the airframe 14 with a translational thrust axis, T, oriented substantially horizontal and parallel to the aircraft longitudinal axis L to provide thrust for high-speed flight. The translational thrust system 30 includes a pusher propeller 32 mounted at an aerodynamic tail fairing 33. The translational thrust axis T, corresponds to the axis of rotation of propeller 32. Although a tail mounted translational thrust system 30 is disclosed in this illustrated non-limiting embodiment, it should be understood that any such system or other translational thrust systems may alternatively or additionally be utilized.

An aircraft, such as aircraft 10 for example, includes at least one landing gear assembly 40 for use during a landing operation and/or while performing land-based maneuvers on a ground surface. In an embodiment, the aircraft 10 includes a nose landing assembly connected to the airframe or fuselage adjacent a first end, and a left landing assembly and a right landing assembly connected to the airframe near the tail of the aircraft 10.

Figure 2B:
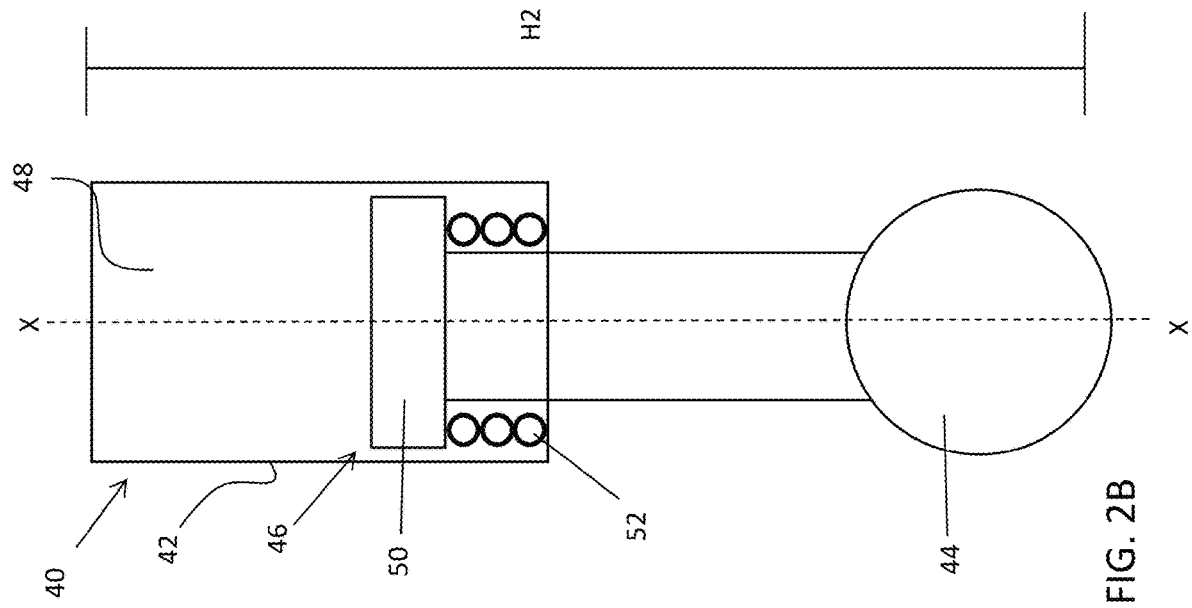
FIG. 2B is cross-sectional diagram of a landing gear assembly in a second configuration according to an embodiment.
Figure 2A:
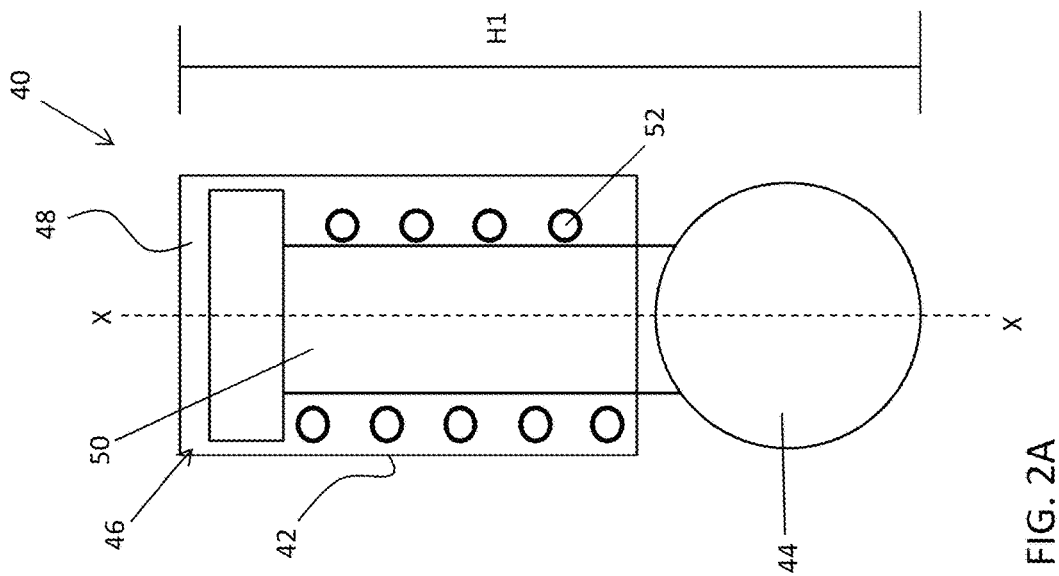
FIG. 2A is cross-sectional diagram of a landing gear assembly in a first configuration according to an embodiment.

With reference now to FIGS. 2A and 2B, an example of a landing gear assembly 40 suitable for use with an aircraft having a rigid main rotor system, such as aircraft 10 for example, is illustrated. The landing gear 40 assembly may include a strut or other support member 42, and a wheel, tire, or other device 44 configured to contact a landing surface connected to the strut 42. In an embodiment, at least one of the landing gear assemblies 40 of an aircraft 10 is configured to transition between various positions or configurations. For example, as shown in the illustrated, non-limiting embodiment, at least one of the landing gear assemblies 40 is configured to transition between a first, retracted configuration (FIG. 2A), and a second, extended configuration (FIG. 2B). It is to be appreciated that the illustrated conditions are intended as an example only and may not necessarily depict a fully extended or compressed condition of the landing gear assembly. Further, although the landing gear assembly 40 is shown translating along a longitudinal axis X of the landing gear assembly 40, in other embodiments the landing gear assembly 40 may additionally or alternatively be configured to rotate between various configurations.

When in the first configuration, the landing gear assembly 40 has a first height H1 measured vertically relative to a tangent extending from the lowest most surface of the wheel, and parallel to the longitudinal axis defined by the landing gear assembly 40. The landing gear assembly 40 similarly has a second height H2 when in the second configuration. The first height and the second height are different. In an embodiment, the second height is larger than the first height. However, in another embodiment, the second height is shorter than the first height.

A mechanism 46 coupled to or integrated with a portion of the landing gear assembly 40 is operable to control movement of the landing gear assembly 40 between the various configurations. In the illustrated, non-limiting embodiment, the mechanism 46 for moving the landing gear assembly is a hydraulic actuator. As shown, the strut 42 of the landing gear assembly 40 is generally hollow and defines an inner chamber 48. A piston 50 is directly or indirectly coupled to the wheel 44 and is configured to translate relative to the strut 42 in response to application of a pressure to an upper surface of the piston 50, such as via a hydraulic fluid for example. Accordingly, the piston 50 is in sliding disposition with the strut 42 such that a portion of the piston 50 telescopes within the inner chamber 48 of the strut 42. In an embodiment, a biasing mechanism 52 may be arranged within the inner chamber 48 about the piston 50 such that a biasing force of the biasing mechanism may bias the piston, and therefore the landing gear assembly 40 into the first configuration, upon removal of the force being applied to the piston 50, such as once the weight of the aircraft is no longer supported by the landing gear assemblies 40. It should be understood by a person having ordinary skill in the art that the hydraulic actuator illustrated and described herein is intended as an example only and that any suitable mechanism 46, such as a servo or linear actuator for example, are also within the scope of the disclosure.

For an aircraft having a rigid rotor construction, such as the aircraft of FIG. 1 for example, the limited ability to tilt or flap the main rotor system 12 is insufficient to achieve the forward thrust required to facilitate easy movement of the aircraft 10 during taxi operations. To overcome this limitation, and with reference now to FIG. 3, the airframe 14 of such a rigid rotor aircraft 10 may be tilted relative to the ground surface, indicated at 60 such that the longitudinal axis L is oriented at a non-zero angle relative to the ground 60. By tilting the airframe 14 in its entirety, the main rotor system 12 coupled to the airframe 14 is similarly tilted thereby achieving tilt of the main rotor system thrust vector without moving the rotational axis A of the main rotor system 12 relative to the airframe 14. Accordingly, the airframe 14 of the aircraft 10 may be tilted to a desired angle, indicated at θ, and specifically to an angle to achieve the tilt necessary to move the aircraft 10 for a taxi operation. In an embodiment, the tilt angle θ formed between the longitudinal axis L of the aircraft 14 and the ground is up to 15°, up to 10°, and in some instances between 4 to 6°. However, it should be understood that any angle is within the scope of the disclosure.

Figure 3:
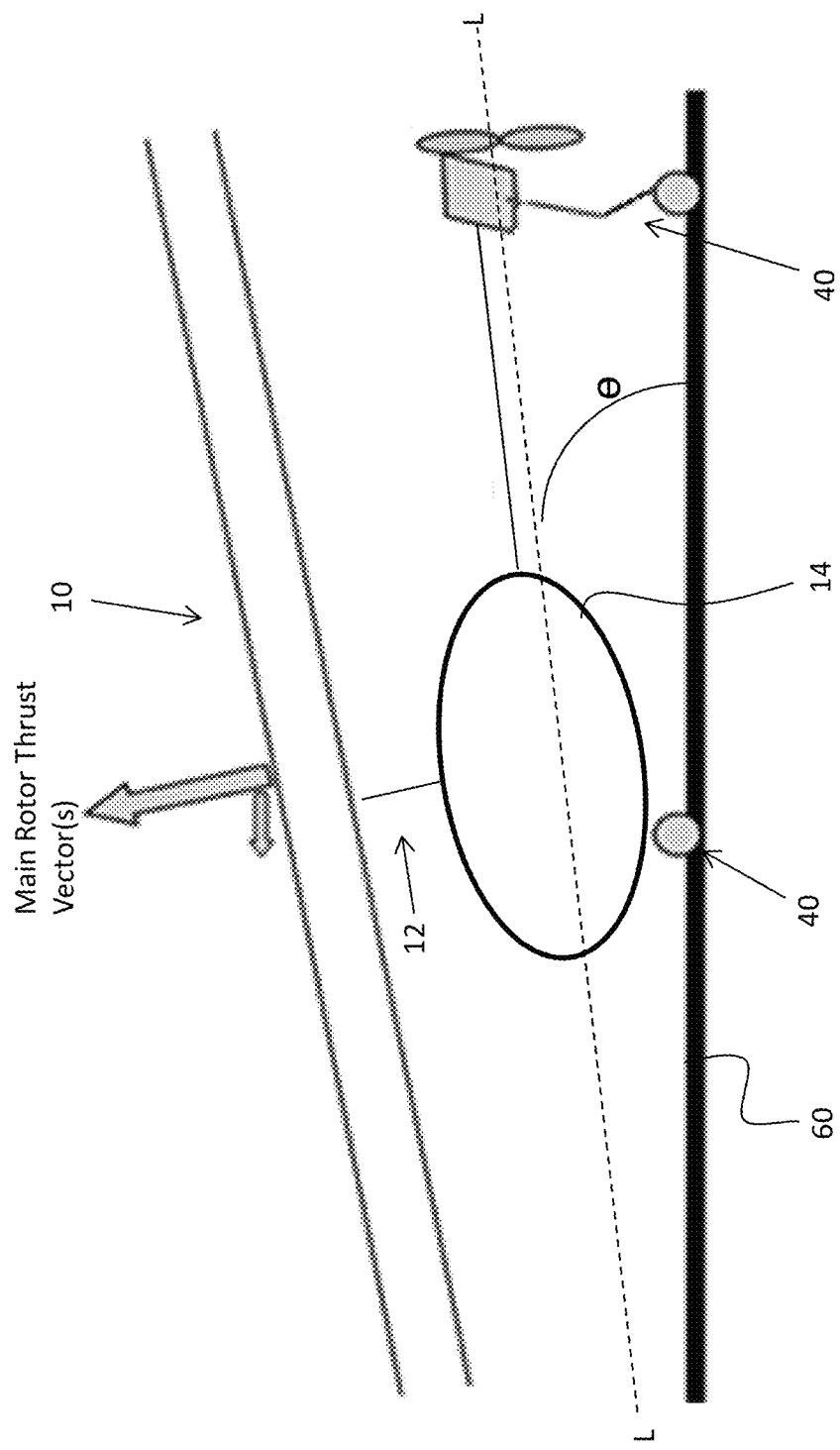
FIG. 3 is a schematic diagram of a tilted rotary wing aircraft according to an embodiment.

In an embodiment, the airframe 14 of the aircraft 10 is tilted by varying a configuration of one or more of the landing gear assemblies 40. For example, the left and right landing gear assemblies 40 may be transformed from a first configuration to a second extended configuration. With this change, the portion of the airframe 14 adjacent the left and right landing gear assemblies 40 is raised to a position vertically above the nose of the aircraft 10, as shown in FIG. 3. In another embodiment, the landing gear assembly 40 positioned near the nose of the aircraft 10 may be transformed from a first configuration to a second configuration, thereby reducing the vertical distance between the nose 37 and the ground 60. However, it should be understood that embodiments where both the landing gear assembly 40 adjacent the nose 37 and the left and right landing gear assemblies 40 near the tail of the airframe 14 are operated in conjunction to achieve a desired angle θ of the longitudinal axis L relative to the ground surface 60.

Figure 4:
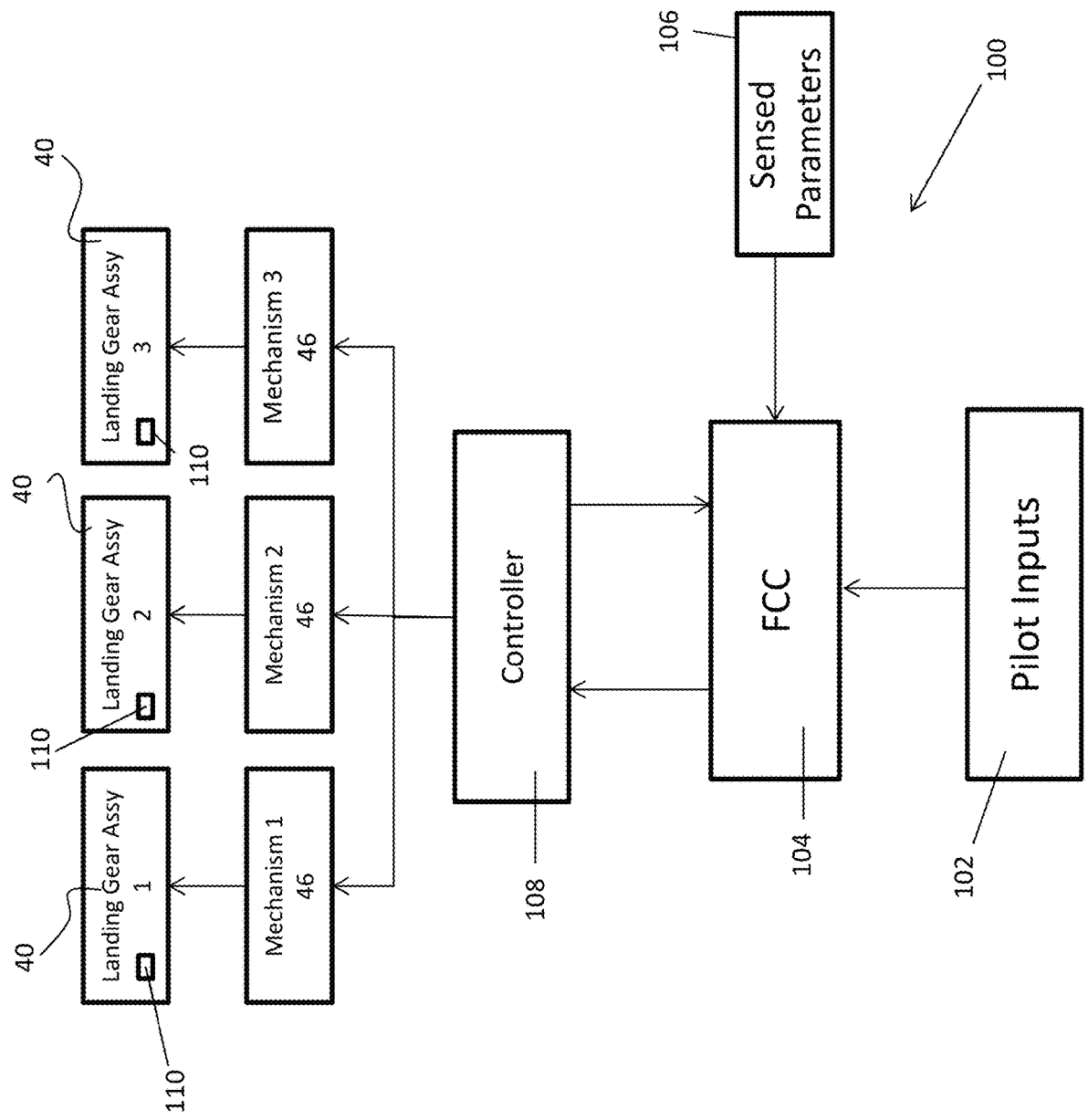
FIG. 4 is a schematic diagram of a control system of an aircraft including at least one landing gear assembly according to an embodiment.

With reference now to FIG. 4, a schematic diagram of a control system 100 of the landing gear assemblies 40 is shown. During a ground or landing operation, such as taxiing or a running landing for example, one or more pilot inputs such as cyclic, collective, and yaw for example, illustrated schematically at 102 are provided to a flight control computer (FCC), illustrated at 104, of the aircraft 10. Feedback from sensors monitoring one or more flight conditions or operating parameters may similarly be provided to the flight control computer 104. The flight control computer 104 provides a signal generated in response to the pilot inputs 102 and the sensed information 106 to a controller, illustrated schematically at 108, arranged in communication with the mechanisms 46 for operating the plurality of landing gear assemblies 40. Although the controller 108 is illustrated as being separate from the flight control computer 104, embodiments where the controller 108 is integrated into the flight control computer 104 are also within the scope of the disclosure.

The mechanisms 46 for transforming a configuration of a corresponding landing gear assembly 40 are illustrated as mechanisms 1, 2, and 3. Although each landing gear assembly 40 is shown as being operated by an independent mechanism 46, embodiments where a mechanism 46 is operable to transform a configuration of more than one landing gear assembly 40 are also contemplated herein. Each of the mechanisms 46 is configured to receive a command from the controller 108 defining a movement of the mechanism 46, and therefore the landing gear assembly 40. In an embodiment, at least one sensor 110 may be associated with the mechanism 46 and/or the landing gear assembly 40 to communicate to the controller 108 a position of the mechanism 46 or the landing gear assembly 40 in real time. Inclusion of such sensors 110 creates a feedback loop that allows the controller 108 to adjust the commands provided to the mechanisms 46 to achieve a desired tilt angle θ.

An aircraft having at least one landing gear assembly 40 operable to adjust a tilt of the airframe 14, and therefore tilt angle between the longitudinal axis L of the aircraft and a ground surface, has enhanced taxiing capabilities compared to conventional rigid rotor aircraft. It can be noted that the ability to adjust the landing gear to achieve various angles of the aircraft relative to the ground plane can also be of benefit and enhance operation during landings and takeoffs from sloped or uneven ground. Further, because the propeller need not be engaged for taxiing, the risk to personnel and of field of debris damage is reduced.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. An aircraft comprising:
   an airframe having an aircraft longitudinal axis;
   at least one landing gear assembly coupled to the airframe; and
   a main rotor system supported by the airframe, the main rotor system being rotatable about an axis of rotation;
   wherein the airframe is tiltable relative to a ground surface in response to adjusting a vertical length of the at least one landing gear assembly to form a non-zero tilt angle between the aircraft longitudinal axis and the ground surface, and
   wherein, when the airframe is tilted, a nose end of the airframe is oriented lower than a tail end of the airframe, the nose end of the airframe being positioned forwardly of the tail end of the airframe in a direction of travel.

2. The aircraft of claim 1, wherein when the airframe has a non-zero tilt angle, operation of the main rotor system generates a forward thrust.

3. The aircraft of claim 1, wherein the main rotor system is a rigid rotor system.

4. The aircraft of claim 1, wherein the main rotor system further comprises:
   an upper rotor system rotatable about the axis of rotation in a first direction; and
   a lower rotor system rotatable about the axis of rotation in a second direction.

5. The aircraft of claim 1, wherein the at least one landing gear assembly includes a mechanism for transforming the at least one landing gear.

6. The aircraft of claim 1, wherein the at least one landing gear assembly further comprises:
   a nose landing gear assembly disposed near the nose end of the airframe; and
   at least one rear landing gear assembly disposed near the tail end of the airframe.

7. The aircraft of claim 6, wherein the configuration of the nose landing gear assembly and the at least one rear landing gear assembly are varied independently.

8. The aircraft of claim 6, wherein the non-zero tilt angle is generated in response to varying the configuration of the nose landing gear assembly.

9. The aircraft of claim 6, wherein the non-zero tilt angle is generated in response to adjusting the vertical height of the at least one rear landing gear assembly.

10. The aircraft of claim 6, wherein the non-zero tilt angle is generated in response to adjusting the vertical height of both the nose landing gear assembly and the at least one rear landing gear assembly.

11. The aircraft of claim 10, wherein the non-zero tilt angle is generated by reducing a vertical length of the nose landing gear assembly and by increasing a length of the at least one rear landing gear assembly.

12. A method of taxiing an aircraft comprising:
determining a desired tilt angle of the aircraft; and
tilting an airframe of the aircraft to achieve the desired tilt angle, wherein titling the airframe includes varying configuration of at least one landing gear assembly of the aircraft by adjusting a vertical length of the at least one landing gear assembly; and
operating a main rotor system of the aircraft while the airframe of the aircraft is at the desired tilt angle to generate a forward thrust,
wherein tilting the airframe includes tilting the airframe to orient a nose end of the airframe lower than a tail end of the airframe, the nose end of the airframe being positioned forwardly of the tail end of the airframe in a direction of travel.

13. The method of claim 12, wherein the desired tilt angle is up to 45 degrees.

14. The method of claim 13, wherein the desired tilt angle is between 4 degrees and 6 degrees.

15. The method of claim 12, wherein varying a configuration of the at least one landing gear assembly includes increasing a vertical length of the landing gear assembly.

16. The method of claim 12, wherein varying a configuration of the at least one landing gear assembly includes decreasing a vertical length of the landing gear assembly.

17. The method of claim 12, wherein varying a configuration of the at least one landing gear assembly includes increasing a vertical length of a first landing gear assembly and decreasing a vertical length of a second landing gear assembly.

18. The method of claim 12, wherein the at least one landing gear assembly further comprises a mechanism operable to vary the configuration of the at least one landing gear assembly in response to a signal.

* * * * *